(12) United States Patent
Sturgeon

(10) Patent No.: US 12,728,802 B2
(45) Date of Patent: Sep. 8, 2026

(54) SNOW PLOW MOUNT

(71) Applicant: Super ATV, LLC, Madison, IN (US)

(72) Inventor: Justin Sturgeon, Versailles, IN (US)

(73) Assignee: Super ATV, LLC, Madison, IN (US)

( * ) Notice: Subject to any disclaimer, the term of this patent is extended or adjusted under 35 U.S.C. 154(b) by 423 days.

(21) Appl. No.: 18/507,139

(22) Filed: Nov. 13, 2023

(65) Prior Publication Data

US 2025/0026282 A1 Jan. 23, 2025

Related U.S. Application Data

(60) Provisional application No. 63/514,452, filed on Jul. 19, 2023.

(51) Int. Cl.

*B60R 11/06* (2006.01)
*E01H 5/06* (2006.01)
*B60R 11/00* (2006.01)

(52) U.S. Cl.

CPC .............. *B60R 11/06* (2013.01); *E01H 5/061* (2013.01); *B60R 2011/004* (2013.01); *B60R 2011/0049* (2013.01); *B60R 2011/0085* (2013.01)

(58) Field of Classification Search

CPC ............... B60R 11/06; B60R 2011/004; B60R 2011/0049; B60R 2011/0086; E01H 5/00; E01H 5/02; E01H 5/06; E01H 5/061; E01H 5/08

USPC .................................. 37/231, 219, 234, 266

See application file for complete search history.

(56) References Cited

U.S. PATENT DOCUMENTS

| | | | | |
|---|---|---|---|---|
| 7,171,770 | B2 * | 2/2007 | Schultz | E01H 5/062 37/232 |
| 2013/0248211 | A1 * | 9/2013 | Warchola | E01H 5/06 172/1 |
| 2022/0034056 | A1 * | 2/2022 | Chalmers | E01H 5/061 |
| 2022/0178098 | A1 | 6/2022 | Rich | |

FOREIGN PATENT DOCUMENTS

| | | | | |
|---|---|---|---|---|
| KR | 20130083629 A * | 7/2013 | | E01H 5/063 |

* cited by examiner

*Primary Examiner* — Christopher J Sebesta
*Assistant Examiner* — Evan A Bregel
(74) *Attorney, Agent, or Firm* — Woodard, Emhardt, Henry, Reeves & Wagner, LLP

(57) ABSTRACT

A mount for a snow plow configured to attach a snow plow blade to a vehicle that includes a frame with a pivot that is rotatably attached to the vehicle and a pivot assembly that includes a blade support, an upper plate, and a lower plate, that is rotatably coupled to the pivot with the upper plate is positioned on the upper side of the pivot, and the lower plate positioned on a lower side of the pivot, where the height of the pivot assembly is greater than the height of the pivot. A snow plow assembly including the mount is also included.

19 Claims, 12 Drawing Sheets

SNOW PLOW MOUNT

CROSS-REFERENCE TO RELATED APPLICATIONS

This application claims the benefit of U.S. Provisional Application No. 63/514,452, filed Jul. 19, 2023, which is hereby incorporated by reference.

BACKGROUND

The present disclosure relates to a snow plow mount for a vehicle.

Vehicles with snow plows can be used to clear snow and other materials from roads, walkways, and other areas. Some vehicles require a mount to attach a snow plow blade. For example, a mount can be attached to an all-terrain vehicle (ATV) that does not have an integrated snow plow. In some cases, the mount does not sufficiently support the snow plow blade, especially if the mount is able to pivot the blade around one or more axes. As a result, the blade and/or mount can deform or break during use.

There is a need for an improved snow plow mount. This can be accomplished through a combination of several design features described below.

DESCRIPTION OF THE SELECTED EMBODIMENTS

Figure 1:
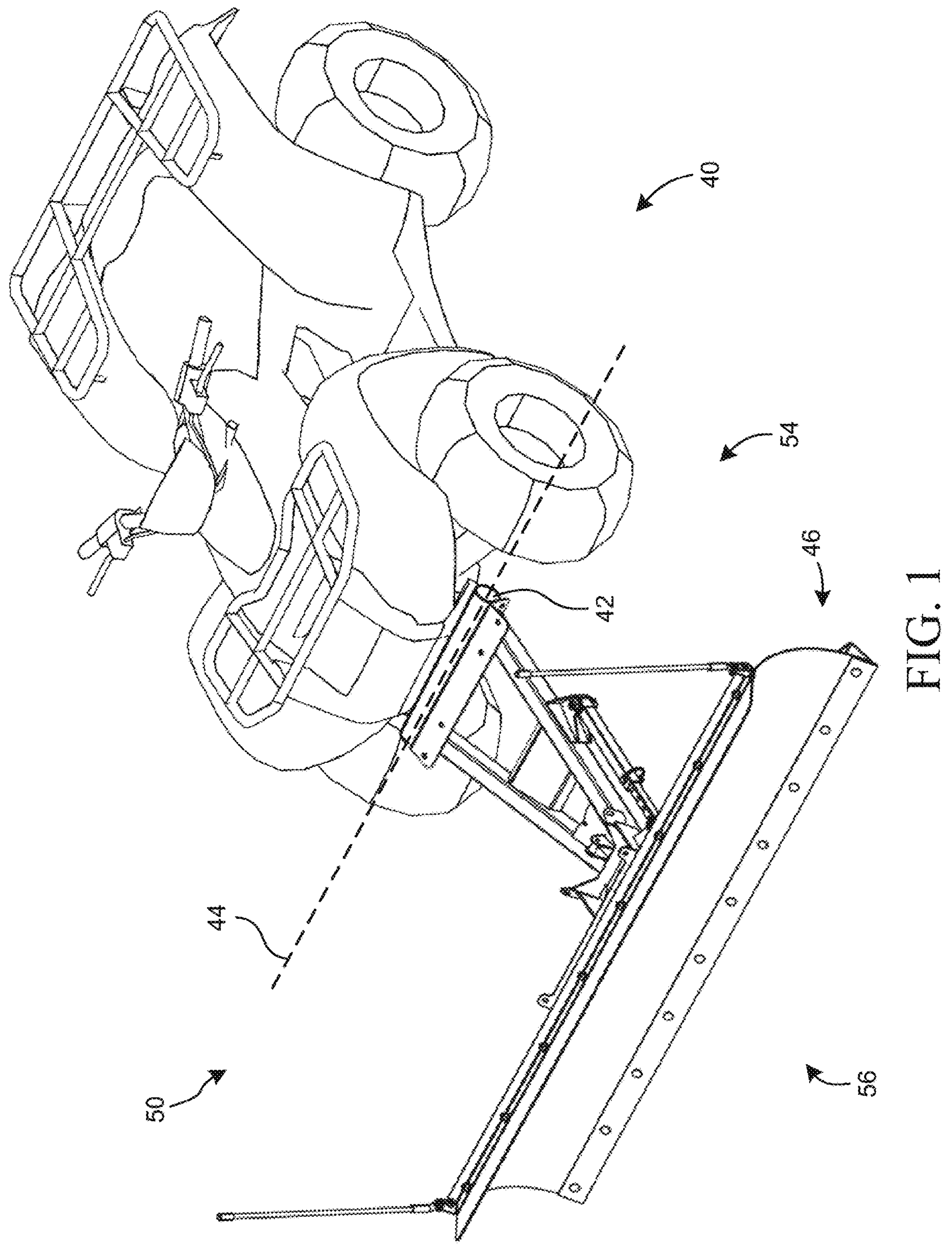
FIG. 1 is a perspective view of a mount and a blade attached to a vehicle.

For the purpose of promoting an understanding of the principles of the claimed invention, reference will now be made to the embodiments illustrated in the drawings and specific language will be used to describe the same. It will nevertheless be understood that no limitation of the scope of the claimed invention is thereby intended. Any alterations and further modifications in the described embodiments, and any further applications of the principles of the claimed invention as described herein are contemplated as would normally occur to one skilled in the art to which the claimed invention relates. One embodiment of the claimed invention is shown in great detail, although it will be apparent to those skilled in the relevant art that some features that are not relevant to the present claimed invention may not be shown for the sake of clarity.

With respect to the specification and claims, it should be noted that the singular forms “a”, “an”, “the”, and the like include plural referents unless expressly discussed otherwise. As an illustration, references to “a device” or “the device” include one or more of such devices and equivalents thereof. It also should be noted that directional terms, such as “left”, “right”, “up”, “down”, “top”, “bottom”, and the like, are used herein solely for the convenience of the reader in order to aid in the reader’s understanding of the illustrated embodiments, and it is not the intent that the use of these directional terms in any manner limit the described, illustrated, and/or claimed features to a specific direction and/or orientation.

Referring to FIG. 1, one embodiment of a vehicle 40, a blade 46, and a mount 50 is shown. Mount 50 is configured to mechanically couple blade 46 to vehicle 40. By coupling blade 46 to vehicle 40, mount 50 allows a user to plow snow and/or move other materials along the ground using vehicle 40. In one example, vehicle 40 is an all-terrain vehicle (ATV). In another example, vehicle 40 can be a utility terrain vehicle (UTV), a truck, and/or another type of vehicle. Blade 46 can be made of a material that generally resists deformation, such as steel and/or plastic. Relative to mount 50, vehicle 40 is positioned towards a vehicle side 54 and blade 46 is positioned towards a plow side 56.

Vehicle 40 includes a rotatable coupling 42 that is positioned between mount 50 and vehicle 40. Near vehicle side 54, mount 50 is configured to mechanically couple to rotatable coupling 42. Rotatable coupling 42 is configured to rotatably couple mount 50 to vehicle 40. As illustrated, rotatable coupling 42 supports mount 50 to pivot relative to vehicle 40 around axis 44. By pivoting mount 50 around hinge axis 44, the position of mount 50 and blade 46 can be adjusted relative to the ground. In one configuration, a user can pivot mount 50 about axis 44 such that blade 46 is positioned on or near the ground in order to plow. In another configuration, the user can pivot mount 50 about axis 44 such that blade 46 is positioned away from the ground in order for blade 46 to avoid obstacles along the ground. In one embodiment, vehicle 40 further includes a winch and/or another mechanism that is operable to move mount 50 such that mount 50 and blade 46 pivot around hinge axis 44 (not illustrated). As should be appreciated, rotatable coupling 42 can include bearings, pintles, and/or another mechanism to support rotation between mount 50 and vehicle 40.

Figure 2:
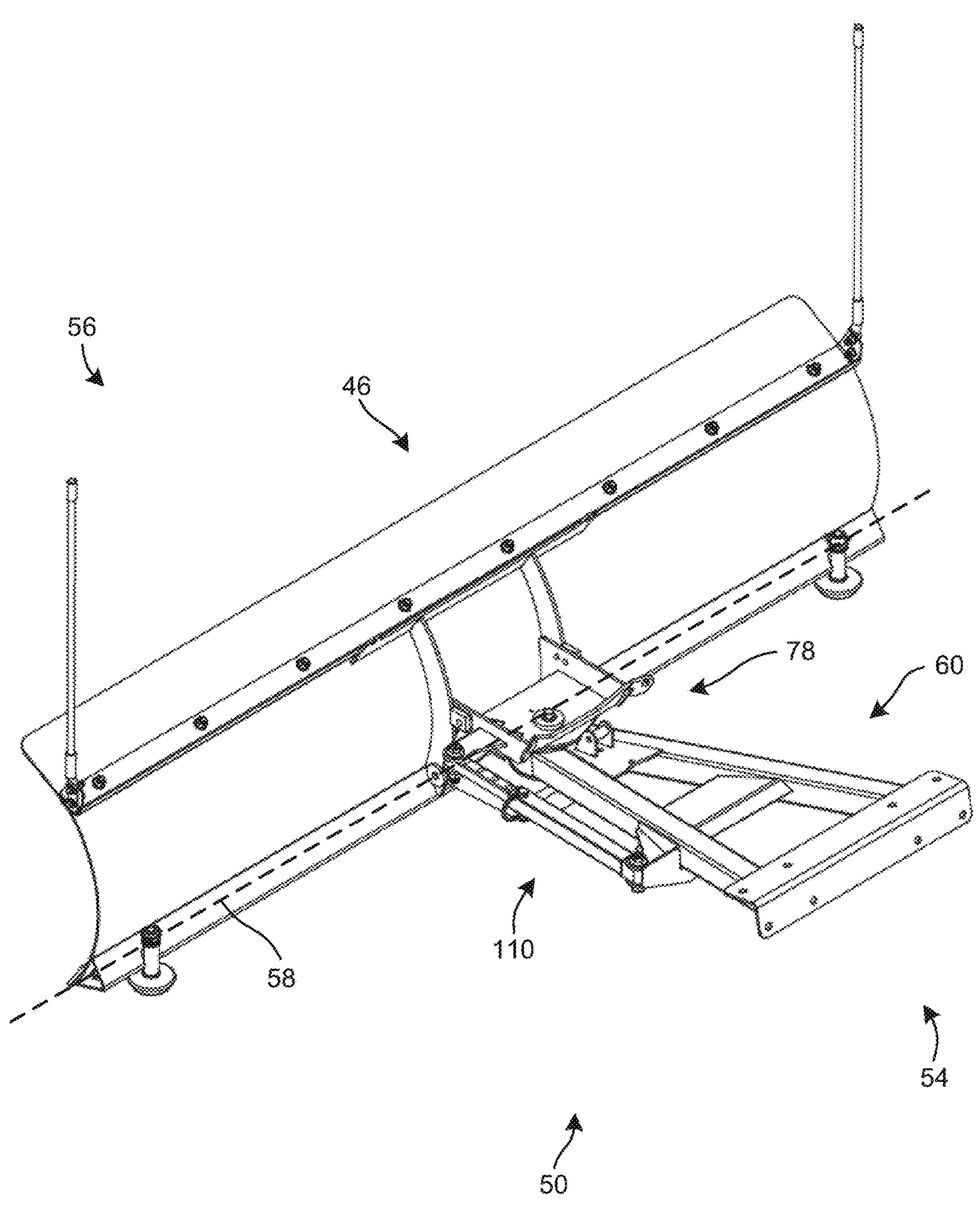
FIG. 2 is a perspective view of the FIG. 1 mount and blade.

Referring to FIG. 2, blade 46 is rotatably coupled to mount 50 about a tilt axis 58. When mount 50 and blade 46 are coupled to vehicle 40, blade 46 is free to pivot about tilt axis 58. For example, blade 46 can pivot about tilt axis 58 when blade 46 contacts an obstacle during plowing. In the configuration illustrated in FIGS. 1 and 2, tilt axis 58 is generally oriented parallel to hinge axis 44. In this arrangement, tilt axis 58 allows blade 46 to be oriented in a desired direction when mount 50 pivots about hinge axis 44. For example, when mount 50 is oriented at one angle relative to vehicle 40, blade 46 can oriented at an opposite angle relative to mount 50 such that blade 46 has a desired orientation.

As illustrated, mount 50 generally includes a frame 60, a pivot assembly 78, and an angle control arm 110. Frame 60 provides the structure of mount 50 and is configured to couple to rotatable coupling 42 on vehicle 40. Pivot assembly 78 is configured to couple to and support blade 46 relative to frame 60. Pivot assembly 78 and frame 60 are rotatably coupled near plow side 56 to allow blade 46 to pivot in a direction transverse to tilt axis 58. Angle control arm 110 is coupled to both frame 60 and pivot assembly 78. Angle control arm is operable to adjust the angular orientation of pivot assembly 78 and blade 46 relative to frame 60.

Figure 3:
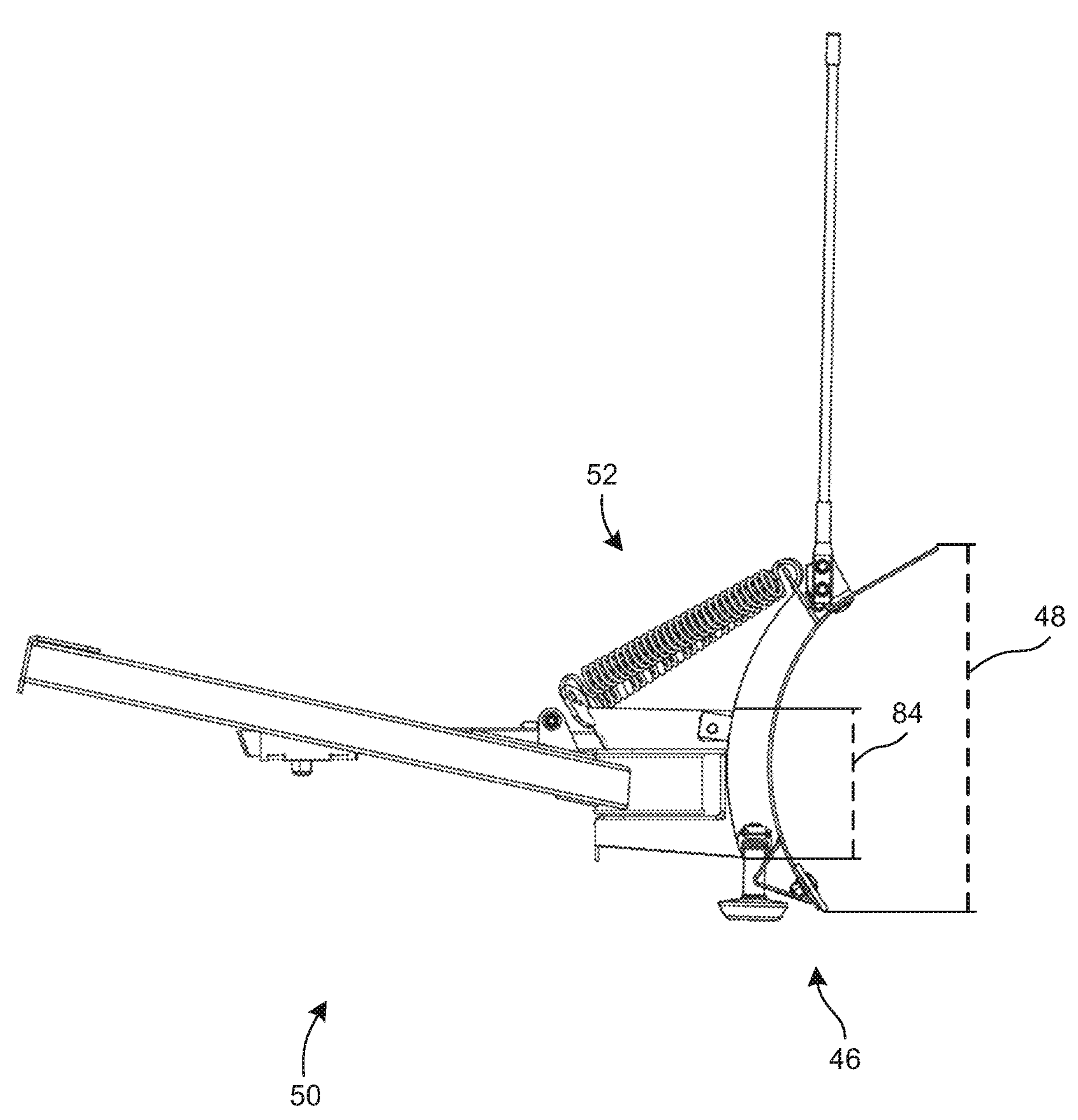
FIG. 3 is a side elevation view of the FIG. 1 mount and blade in an upright configuration with springs.

Referring to FIG. 3, blade 46 is further coupled to mount 50 through springs 52. Springs 52 are configured to bias blade 46 towards the illustrated arrangement in FIG. 3. For example, when an obstacle causes blade 46 to pivot about tilt axis 58, springs 52 can pivot blade 46 back to an upright orientation. By biasing blade 46 this way, springs 52 maintain a desired orientation of blade 46 to promote effective plowing.

As illustrated, blade 46 defines a blade height 48. Similarly, pivot assembly 78 defines a pivot assembly height 84. Pivot assembly height 84 is considerable compared to blade height 48. In one example, the ratio of pivot assembly height 84 to blade height 48 is no more than 1:2. In another example, the ratio of pivot assembly height 84 to blade height 48 at least 1:3. In one specific example, the ratio is 2:5. By having a substantial pivot assembly height 84, mount 50 provides more rigid support for blade 46 through pivot assembly 78.

Figure 4:
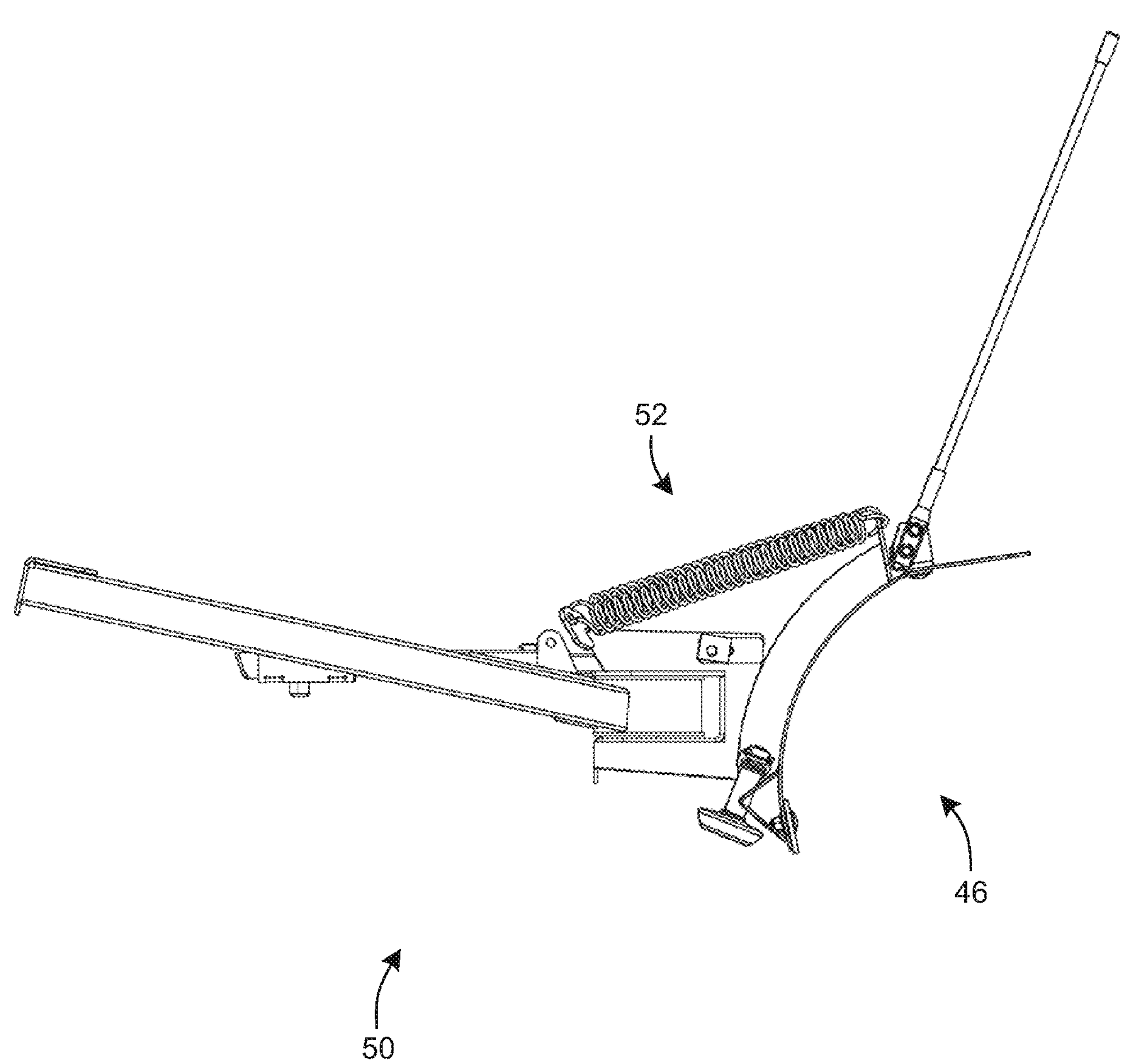
FIG. 4 is a side elevation view of the FIG. 3 configuration in a tilted configuration.

Referring to FIG. 4, blade 46 and mount 50 can be arranged in a tilted configuration. In contrast to the upright configuration in FIG. 3, blade 46 can pivot about tilt axis 58 such that blade 46 is angled towards the ground relative to mount 50. As noted previously, blade 46 can pivot into a tilted orientation when blade 46 contacts an obstacle during plowing, such as a stray object and/or a pile of plowed snow. In the tilted orientation, springs 52 stretch and apply force to blade 46 toward vehicle side 54. The range that blade 46 can pivot about tilt axis 58 relative to mount 50 can be affected by the strength of springs 52, the shape of mount 50 and blade 46, and/or other factors.

Figure 5:
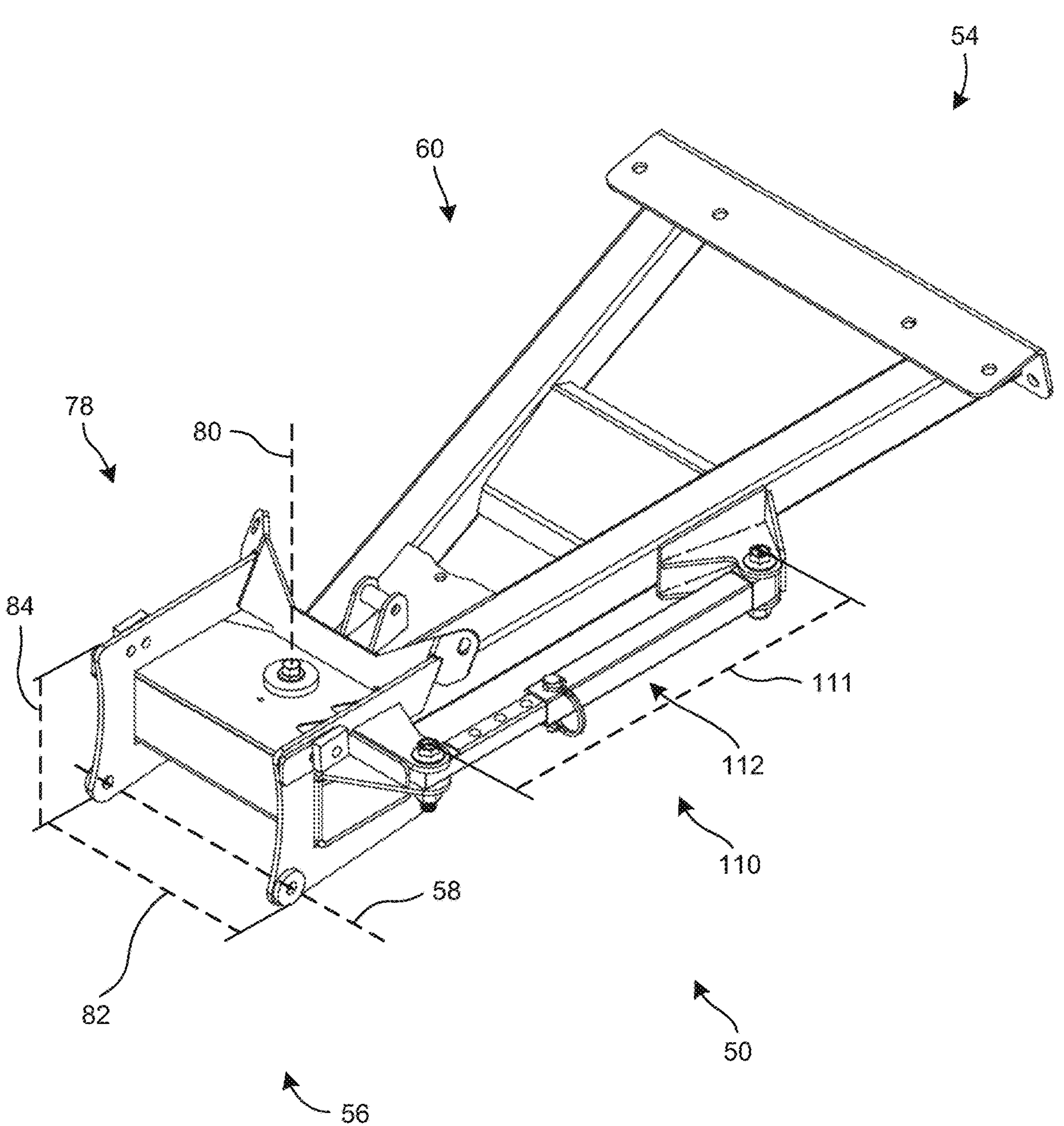
FIG. 5 is a perspective view of a mount component of the FIG. 1 mount and blade.
Figure 6:
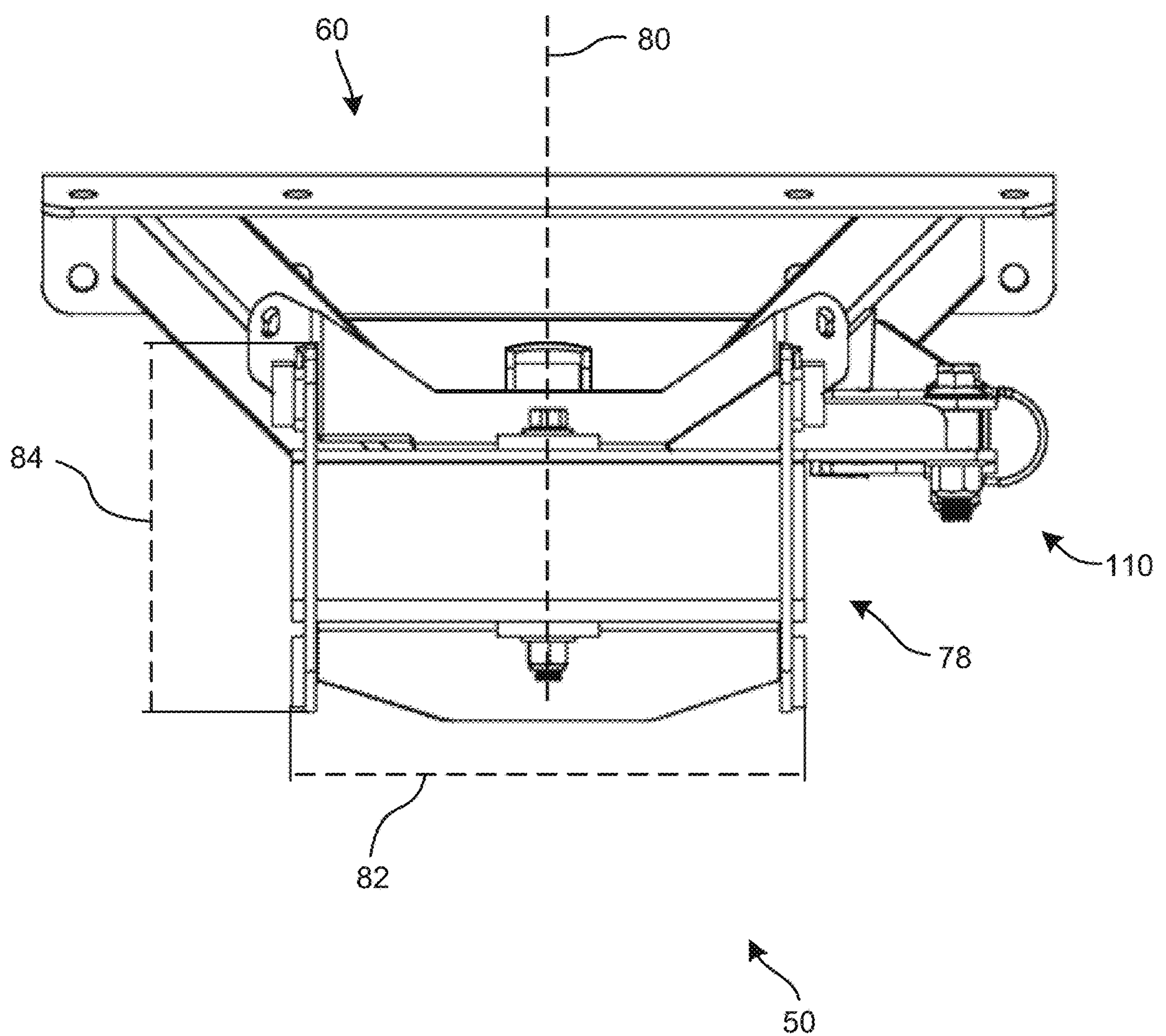
FIG. 6 is a front elevation view of the FIG. 5 mount.

FIGS. 5 and 6 illustrate isolated views of mount 50. Pivot assembly 78 is configured to pivot about a pivot axis 80 relative to frame 60. Pivot axis 80 is generally oriented in a direction transverse to axis 44 and tilt axis 58. Pivoting pivot assembly 78 relative to frame 60 permits blade 46 to be angled towards a left or a right side of vehicle 40 such as to direct plowed snow towards the left or right side. Furthermore, having a substantial pivot assembly height 84 allows mount 50 to provide strong support for blade 46 particularly as blade 46 pivots about pivot axis 80.

As noted, angle control arm 110 is configured to fix the angle of pivot assembly 78 relative to frame 60 about pivot axis 80. Angle control arm 110 defines an arm length 111. Angle control arm 110 further includes tubes 112 that are movably coupled to one another. Tubes 112 are configured to slide along one another in a direction along arm length 111. By sliding tubes 112 relative to each other, arm length 111 can be lengthened or shortened. Angle control arm 110 is pivotably coupled to frame 60 on one end and pivotably coupled to pivot assembly 78 on an opposite end. By adjusting arm length 111, angle control arm 110 can change the fixed angle between pivot assembly 78 and frame 60. As should be appreciated, mount 50 could include a different mechanism to fix the position of pivot assembly 78, such as a clamp or another device.

As illustrated, pivot assembly 78 defines a pivot assembly width 82 and a pivot assembly height 84. Pivot assembly height 84 is comparable to pivot assembly width 82 such that pivot assembly 78 has a box-like structure. The box-like structure of pivot assembly 78 provides stability for blade 46 as blade 46 is coupled to mount 50, particularly around pivot axis 80. In one example the aspect ratio of pivot assembly height 84 to pivot assembly with 82 is no more than 1:2. In another example, the aspect ratio is between 1:2 and 3:4. In yet another example, the aspect ratio is 5:8. Compared to a mount with a lower aspect ratio, mount 50 can provide greater stability and support for blade 46 as blade 46 is coupled to mount 50. Mount 50 particularly provides greater support for blade 46 as the position of blade 46 varies around tilt axis 58 and around pivot axis 80.

Figure 7:
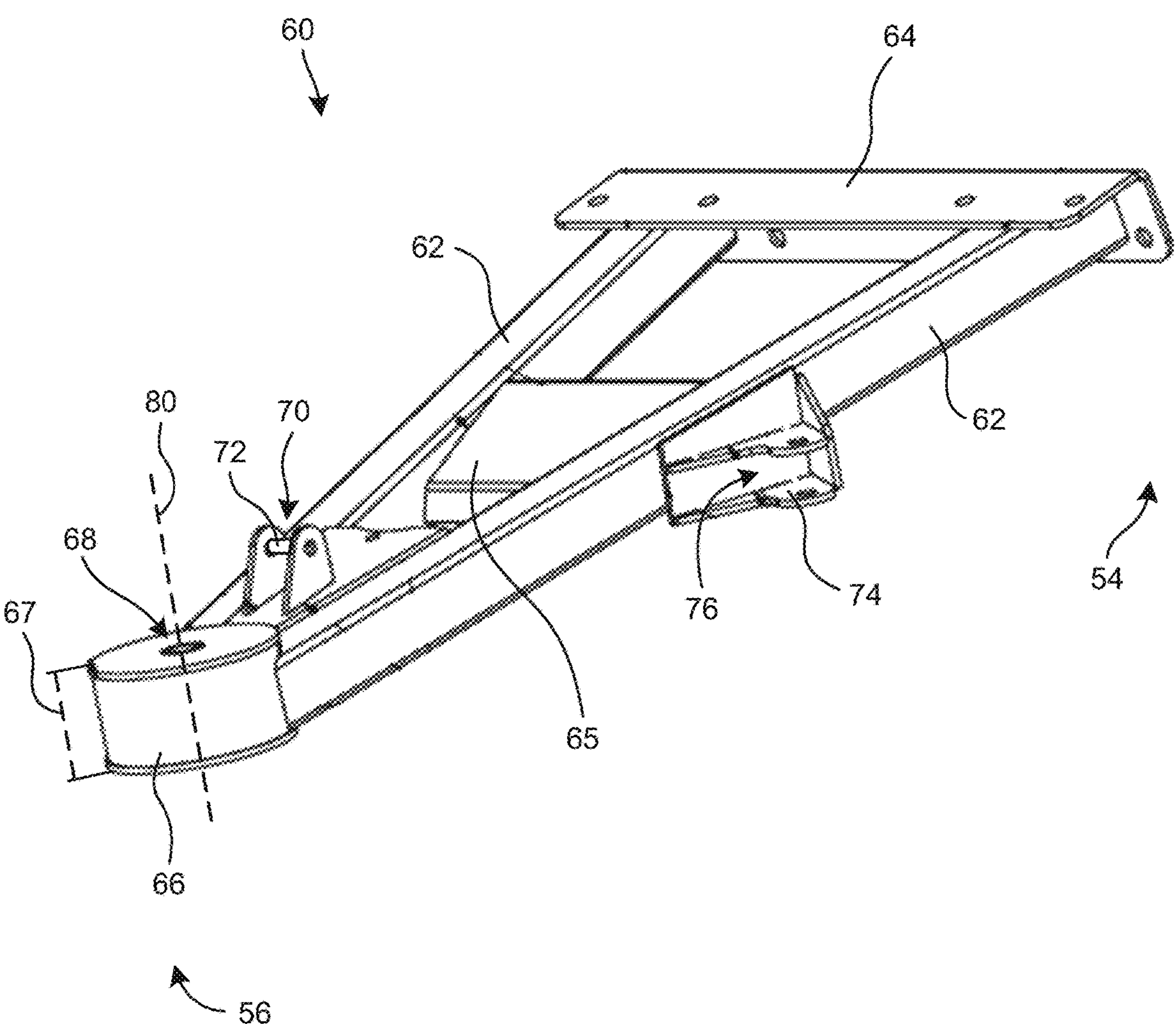
FIG. 7 is a perspective view of a frame, a component of the FIG. 5 mount.

Referring to FIG. 7, an isolated view of frame 60 is shown. Frame 60 generally includes one or more beams 62, a vehicle mounting plate 64, a cross member 65, and a pivot 66. Beams 62 extend from vehicle side 54 to plow side 56. Beams 62 are made from a rigid and strong material, such as carbon steel. In one example, beams 62 are formed from cold rolled steel that is formed into a tube-like structure. In another example, beams 62 can be formed from a solid piece of material and/or can be made from a different material, such as aluminum, plastic, and/or another rigid material. Beams 62 provide structural support for frame 60. In the illustrated example, frame 60 includes two beams 62 that are angled inward from vehicle side 54 to plow side 56 such as to form an A-shape.

Vehicle mounting plate 64 is coupled to beams 62 towards vehicle side 54. Similar to beams 62, vehicle mounting plate 64 can be formed from a rigid material, such as cold rolled steel and/or aluminum. Vehicle mounting plate 64 is configured to couple mount 50 to rotatable coupling 42 on vehicle 40. In one embodiment, vehicle mounting plate 64 supports a rotational coupling between mount 50 and vehicle 40. Further, frame 60 includes a hook mount 70 that is configured to couple to a device on vehicle 40. In one example, hook mount 70 is configured to couple to a winch on vehicle 40 that can pivot mount 50 around axis 44 as described above. In another example, the device on vehicle 40 can be manually operated, such as a handle, lever, pulley, and/or another device. Hook mount 70 includes a hook pin 72 that is positioned within hook mount 70. The device on vehicle 40 is configured to couple to hook pin 72. In one example, hook pin can be integrally formed with hook mount 70.

Cross member 65 is coupled toward beams 62 and positioned between vehicle side 54 and plow side 56. Cross member 65 provides an additional structural connection between beams 62. Similar to beams 62 and vehicle mounting plate 64, cross member 65 can be made from a rigid material, such as cold rolled steel and or aluminum. In the illustrated embodiment, cross member 65 is generally flat. In another embodiment, cross member 65 can be formed in a beam shape and/or in another shape. Further, frame 60 can include more than one cross member 65.

Pivot 66 is coupled to beams 62 towards plow side 56. In the illustrated example, pivot 66 is cylindrically shaped and beams 62 are coupled on a curved surface of pivot 66. Similar to other parts of frame 60, pivot 66 can be made from a rigid material such as cold rolled steel and or aluminum. In one example, pivot 66 is formed from multiple pieces of carbon steel and one piece is curved to form the curved portion of the cylindrical shape. Pivot 66 is configured to couple to pivot assembly 78 and to support rotation of pivot assembly 78 around pivot axis 80. As shown pivot 66 defines a pivot height 67. As shown, pivot height 67 extends both below and above beams 62. Pivot 66 provides a strong structural support for pivot assembly 78 by having a substantial pivot height 67. In one embodiment, the ratio of pivot height 67 to pivot assembly height 84 is at least 1:2. In another embodiment, the ratio of pivot height 67 to pivot assembly height 84 is between 1:4 and 1:2. The shape of pivot 66 allows pivot assembly 78 to have a box-like shape and to subsequently support blade 46. In one embodiment, pivot 66 is shaped such as to have a same aspect ratio between height and width as pivot assembly 78. Further, pivot 66 defines a pin opening 68 that extends through pivot 66 along pivot axis 80. Pin opening 68 is configured to receive a pin or another device that can rotatably couple pivot 66 to pivot assembly 78. As should be appreciated, pivot 66 could be shaped differently and/or could be configured to couple to pivot assembly 78 in a different way.

Frame 60 further includes an arm mount 74 that is configured to couple to angle control arm 110. In one embodiment, arm mount 74 is formed from the same material as other parts of frame 60, such as carbon steel and/or aluminum. Arm mount 74 defines an arm opening 76 that is configured to accommodate angle control arm 110. Arm mount 74 can pivotably couple to angle control arm 110 through a pin and pin openings, a gudgeon and pintle, a fastener with bushings, and/or another device.

Frame 60 can be constructed in a variety of ways. In the illustrated embodiment, the parts of frame 60 are formed separately and are coupled together to form frame 60. For example, beams 62, vehicle mounting plate 64, cross member 65, pivot 66, hook mount 70, and arm mount 74 can be formed individually and then coupled together through welds, rivets, bolts, and/or other fasteners. In another embodiment, one or more parts of frame 60 are integrally formed, for example using a mold and/or another device. In one example, beams 62 can be integrally formed with vehicle mounting plate 64 and pivot 66. Additionally, frame 60 can be made from one material or from multiple materials. In one example, each part of frame 60 is made from carbon steel. In another example, parts of frame 60 are made from carbon steel, aluminum, and/or another metal.

Figure 8:
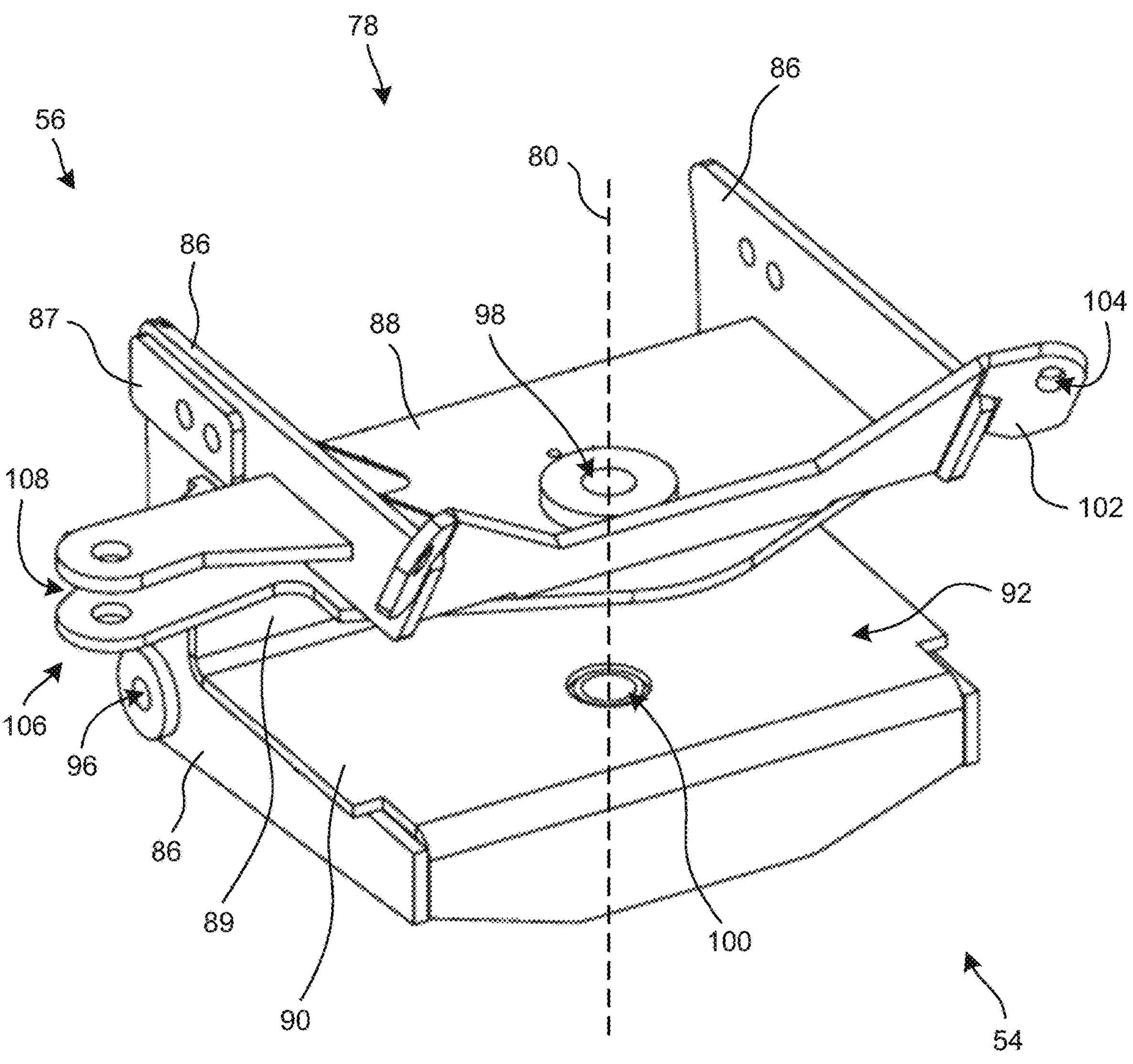
FIG. 8 is a perspective view of a pivot assembly, a component of the FIG. 5 mount.
Figure 9:
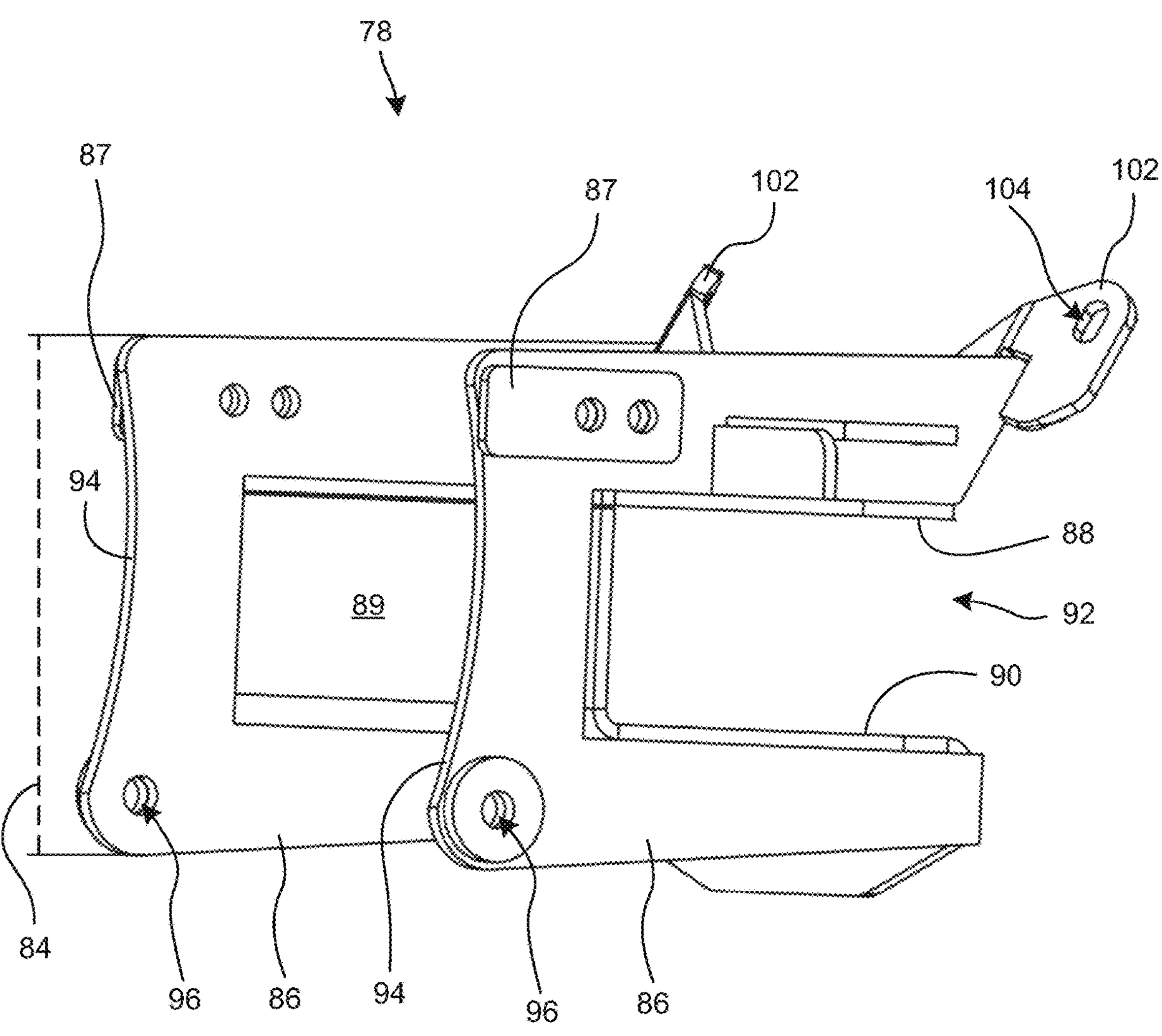
FIG. 9 is a side perspective view of the FIG. 8 pivot assembly.

Referring to FIGS. 8 and 9, an isolated view of pivot assembly 78 is shown. Pivot assembly 78 generally includes flanges 86, adjustment blocks 87, an upper plate 88, a forward plate 89 and a lower plate 90. Upper plate 88, forward plate 89 and lower plate 90 may be a monolithic structure formed from a single piece of material or formed from a plurality of pieces bonded together such as by welding. In the illustrated embodiment, forward plate 89 and lower plate 90 are parallel to each other. In the illustrated embodiment, flanges 86 are oriented perpendicular to upper plate 88.

Flange 86 is positioned around upper plate 88, forward plate 89 and lower plate 90 and on both lateral sides of pivot assembly 78. Flange 86 is formed from one or more plates of rigid material, such as cold rolled steel. Pivot assembly 78 is configured to contact blade 46 through flange 86. Further, flange 86 is configured to couple pivot assembly 78 to blade 46. As shown, flange 86 defines pivot assembly height 84. As noted previously, pivot assembly height 84 is substantial compared to the size of blade 46. For example, pivot assembly 78 can extend across up to half of blade height 48. In this way, flange 86 provides a high degree of structural support for blade 46, particularly in comparison to a shorter snow plow mount.

As shown in FIG. 9, flange 86 defines a blade surface 94 on a plow side 56. Blade surface 94 is shaped to mirror a surface on blade 46. Flange 86 is configured to contact blade 46 across most or even all of blade surface 94. Through blade surface 94, flange 86 can contact blade 46 over a large surface area such as to further enforce the structural support for blade 46. Flange 86 additionally defines blade openings 96. Blade openings 96 are configured to accommodate one or more pins, bolts, and/or other fasteners that rotatably couple flange 86 and blade 46. Blade openings 96 extend through portions of flange 86 along tilt axis 58 such as to support rotation of blade 46 about tilt axis 58. In addition to one or more fasteners, blade openings 96 can accommodate one or more bushings and/or another type of bearing to facilitate rotation. In the illustrated embodiment, blade openings 96 are positioned on a lower portion of flange 86. By coupling flange 86 to blade 46 on a lower portion, more torque is required to pivot blade 46 from the lower portion. For example, blade 46 can impact an obstacle on a lower portion and substantially maintain the same position around tilt axis 58.

Adjustment blocks 87 are positioned on an opposite side of flange 86 from blade openings 96. Through contacting blade 46, adjustment blocks 87 can be used to adjust the resting orientation of blade 46 about tilt axis 58. For example, the resting orientation of mount 50 and blade 46 may differ when coupled to vehicles 40 at varying heights. To account for such differences, a user can arrange adjustment blocks 87 such as to achieve a desired orientation of blade 46 about tilt axis 58. In the illustrated example, one adjustment block 87 is positioned on each lateral side of pivot assembly 78. Adjustment blocks 87 are movingly coupled to flange 86 through one or more pins, bolts, screws, and/or other fasteners. In one embodiment, adjustment blocks 87 are fixed in position and orientation on flange 86 and a fastener must be loosened to adjust the position and/or orientation of adjustment blocks 87. Further, adjustment blocks 87 can couple to flange 86 at multiple positions. By allowing adjustment blocks 87 to couple to flange 86 at various positions and orientations, adjustment blocks 87 can adjust the orientation of blade 46 within a relatively large range and with high precision. As should be appreciated, adjustment blocks 87 could be positioned such that blade 46 contacts flange 86 and not adjustment blocks 87.

Upper plate 88 is positioned on an upper portion of pivot assembly 78 and lower plate 90 is positioned on a lower portion of pivot assembly 78. Upper plate 88 and lower plate 90 are formed from plates of rigid material, such as cold rolled steel. In one embodiment, upper plate 88 and lower plate 90 are formed from a single plate such that upper plate is continuous with lower plate 90 along a side of pivot assembly 78. Upper plate 88 and lower plate 90 define a pivot opening 92 that is configured to accommodate pivot 66. When pivot 66 is coupled to pivot assembly 78, upper plate 88 is near an upper end of pivot 66 and lower plate 90 is positioned near a lower end of pivot 66. In one embodiment, pivot 66 structurally supports pivot assembly through contact with upper plate 88. As illustrated, upper plate 88 defines an upper opening 98 and lower plate 90 defines a lower opening 100. Upper opening 98 and lower opening 100 are aligned with pin opening 68 along pivot axis 80. Similar to pin opening 68, upper opening 98 and lower opening 100 are configured to receive a pin or another device that can rotatably couple pivot 66 to pivot assembly 78. As should be appreciated, pivot 66 could couple to pivot assembly 78 in a different way.

Pivot assembly 78 further includes a spring bracket 102 that is configured to couple to springs 52. Spring bracket 102 is angled relative to upper plate 88 and extends in an outward and upward direction from upper plate 88 and flange 86. In the illustrated embodiment, spring bracket is positioned toward vehicle side 54 of pivot assembly 78. Spring bracket 102 defines spring openings 104. Spring openings 104 are configured to accommodate one end of spring 52 and/or a fastener that connects to spring 52, such as a hook and/or an eye bolt. Blade 46 is configured to couple to the other end of springs 52 either directly or through another fastener. Spring bracket 102 and upper plate 88 may be a monolithic structure formed from a single piece of material or may be formed from a plurality of pieces bonded together such as by welding.

Similar to frame 60, pivot assembly 78 includes an arm mount 106 that is configured to couple to angle control arm 110. In one embodiment, arm mount 106 is formed from the same material as other parts of pivot assembly 78, such as carbon steel and/or aluminum. Arm mount 106 defines an arm opening 108 that is configured to accommodate angle control arm 110. Arm mount 106 can rotatably couple to angle control arm 110 through a pin and pin openings, a gudgeon and pintle, a fastener with bushings, and/or another device.

Pivot assembly 78 can be constructed in a variety of ways. In the illustrated embodiment, the parts of pivot assembly 78 are formed separately and are coupled together to form pivot assembly 78. For example, flange 86, upper plate 88, lower plate 90, spring bracket 102, and/or arm mount 106 can be formed individually and then coupled together through welds, rivets, bolts, and/or other fasteners. In another embodiment, one or more parts of frame 60 are integrally formed, for example using a mold and/or another device. In one example, flange 86, upper plate 88, and lower plate 90 can be integrally formed from a single piece of material. Additionally, pivot assembly 78 can be made from one material or from multiple materials. In one example, each part of pivot assembly 78 is made from carbon steel. In another example, parts of frame 60 are made from carbon steel, aluminum, and/or another metal.

Figure 10:
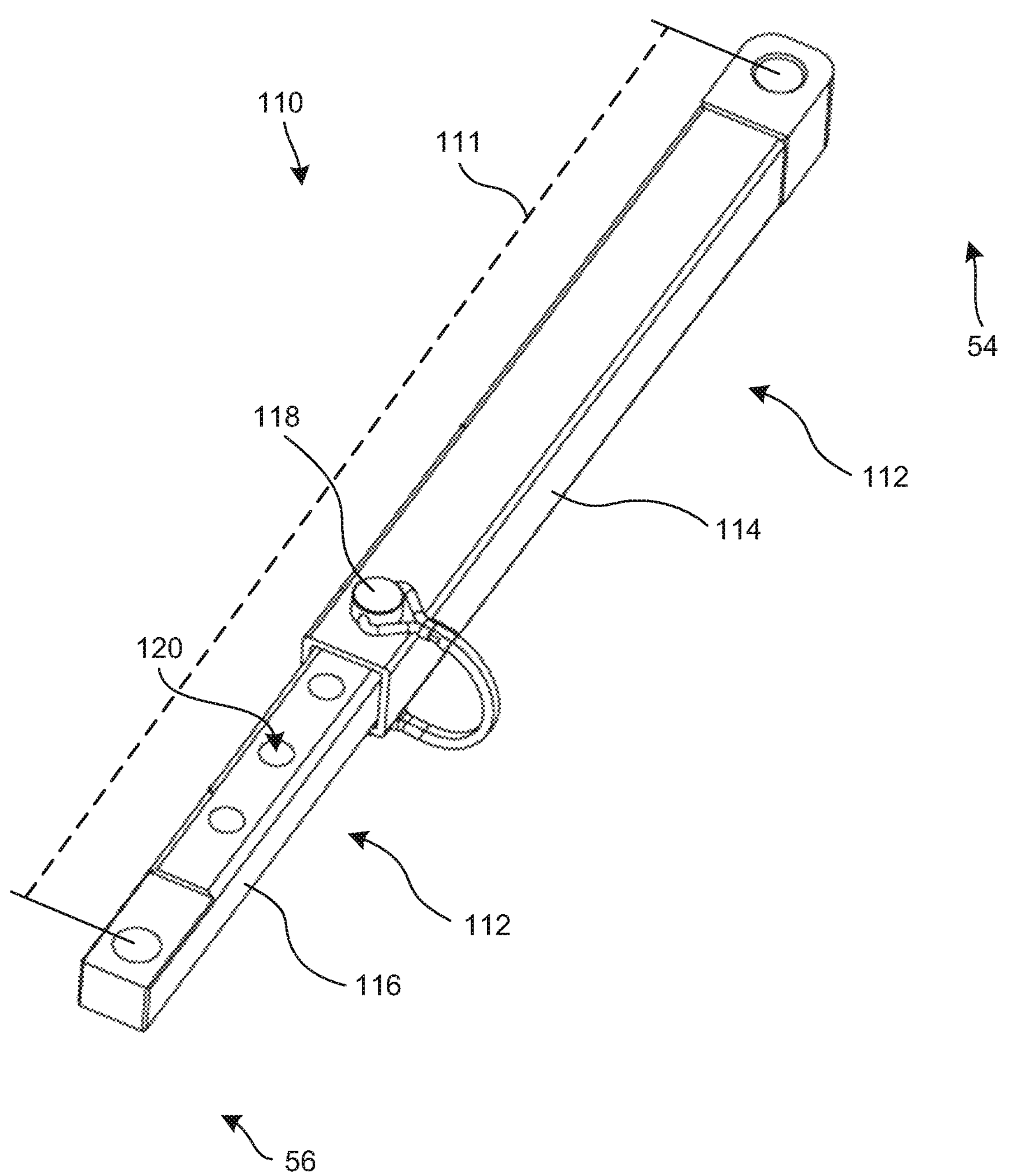
FIG. 10 is a perspective view of an angle control arm, a component of the FIG. 5 mount.

Referring to FIG. 10, tubes 112 of angle control arm 110 are telescoping such that arm length 111 is adjustable. Angle control arm 110 further includes an arm pin 118 that is configured to fix the positions of tubes 112 relative to one another. In one embodiment, tubes 112 includes a vehicle tube 114 that is positioned towards vehicle side 54 and a plow tube 116 that is positioned towards plow side 56. In the illustrated example, plow tube 116 is positioned within vehicle tube 114. Tubes 112 define arm pin openings 120. Arm pin openings 120 are configured to accommodate an arm pin 118. When an arm pin 118 is positioned within an arm pin opening 120 on each tube 112, the position of each tube 112 is fixed relative to one another. In this way, arm length 111 can be selectively fixed, and therefore the position of pivot assembly 78 about pivot 66 can be selectively fixed. At least one tube 112 defines multiple arm pin openings 120 such that arm length 111 can be fixed at multiple intervals. In the illustrated example, plow tube 116 defines multiple arm pin openings 120 that allow a user to adjust angle control arm 110 to multiple arm lengths 111. As should be appreciated, angle control arm 110 can include any number of tubes 112 and arm length 111 can selectively fix through one or more alternative mechanisms. In an alternate example, angle control arm 110 is hydraulically or electrically powered to adjust arm length 111.

Figure 11:
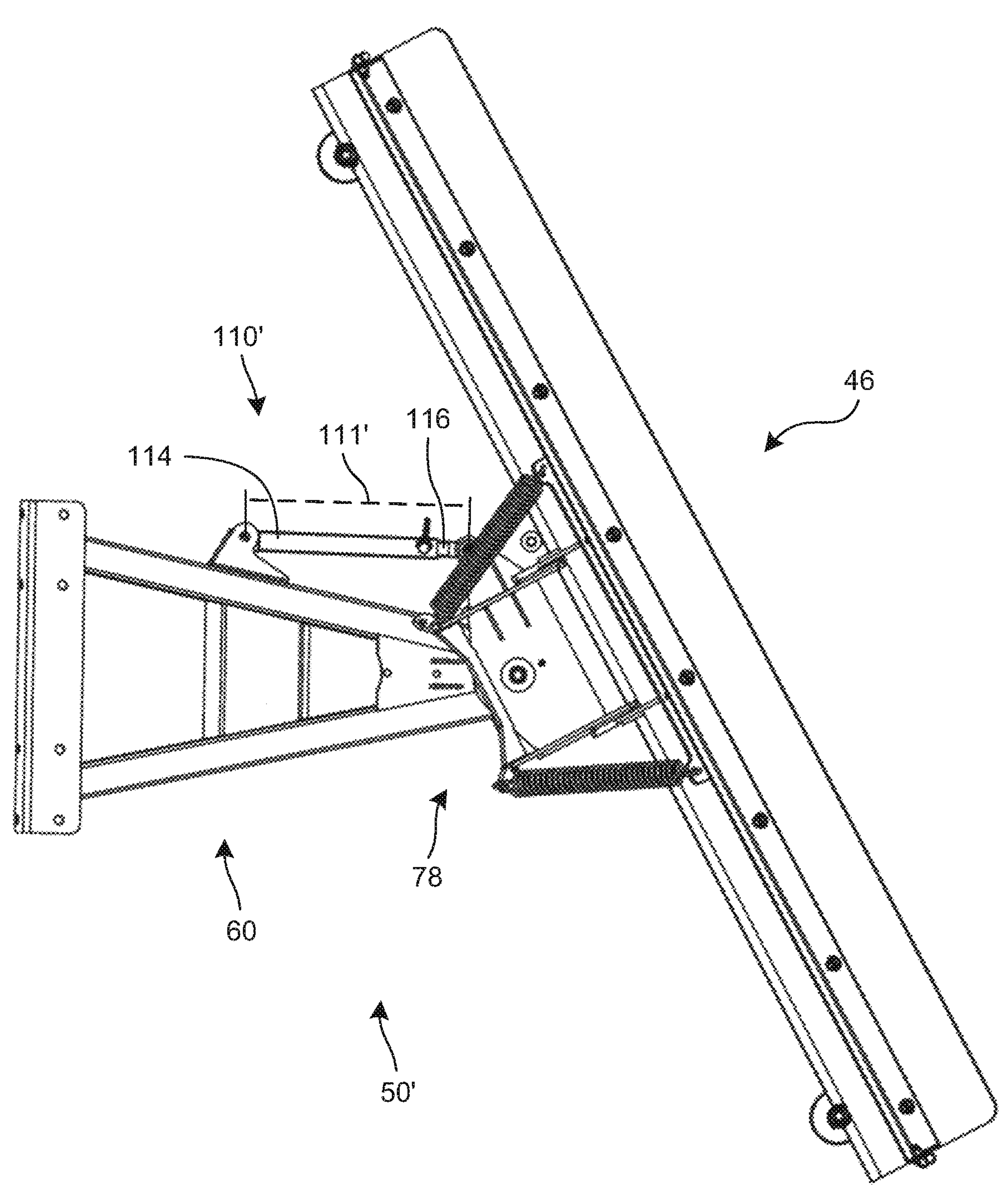
FIG. 11 is a top plan view of the FIG. 1 mount and blade in a right-pivoted configuration.
Figure 12:
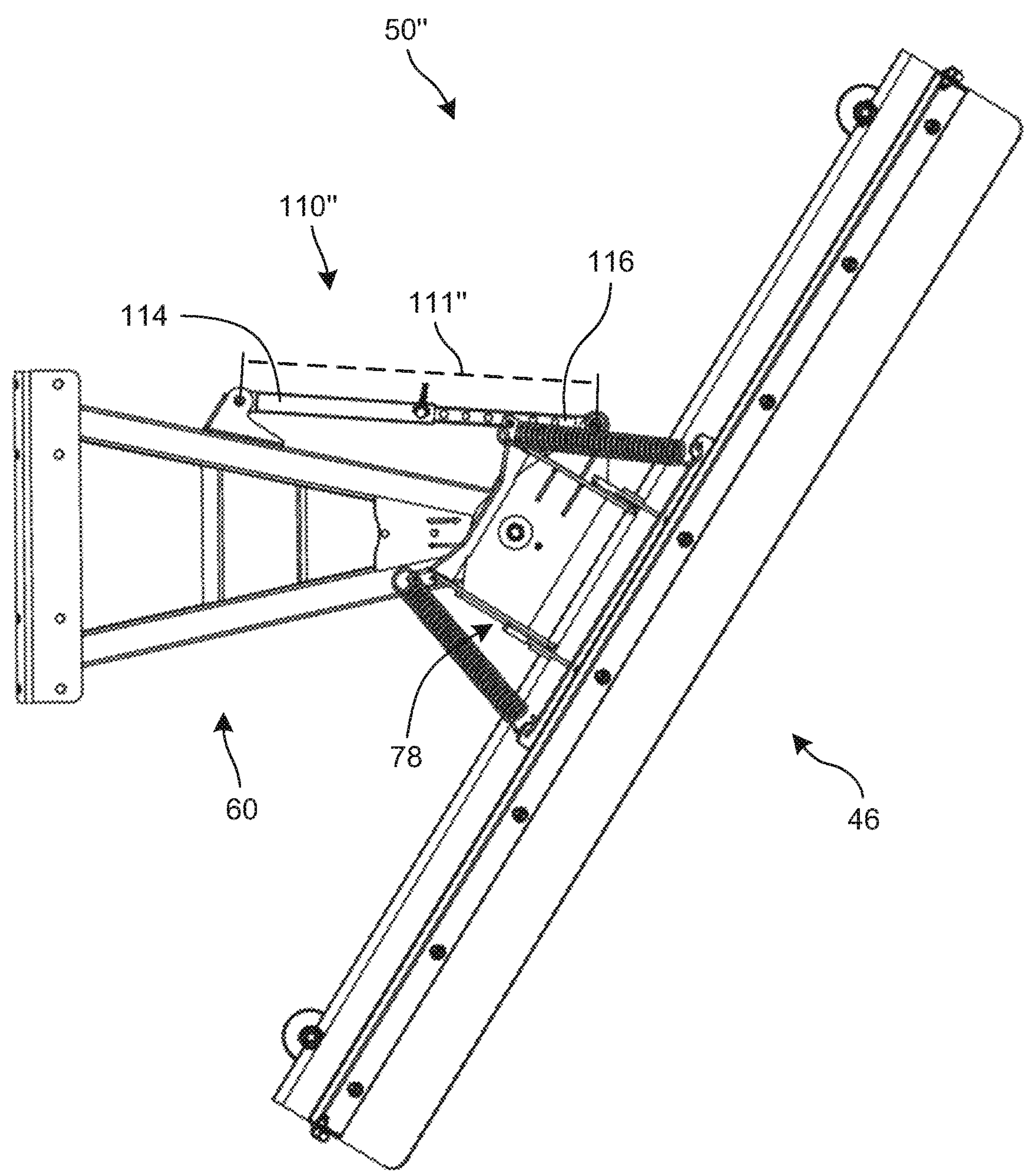
FIG. 12 is a top plan view of the FIG. 1 mount and blade in a left-pivoted configuration.

As illustrated in FIGS. 11 and 12, blade 46 and pivot assembly 78 can pivot about pivot axis 80 within a range between a left-pivoted and right-pivoted orientation. In the left-pivoted configuration in FIG. 11, mount 50' is arranged such that blade 46 is pivoted towards a left side of vehicle 40. In this orientation, blade 46 can direct snow towards the left side of vehicle 40. As illustrated, angle control arm 110' is collapsed such that plow tube 116 is positioned further within vehicle tube 114 and such that arm length 111' is shorter than in the arrangement of FIGS. 1-6. Blade 46 and pivot assembly 78 are fixed in the left-pivoted configuration due to the shortened arm length 111' of angle control arm 110'.

Conversely, mount 50" is arranged in a right-pivoted configuration in FIG. 12. In the illustrated arrangement, blade 46 and pivot assembly 78 are oriented about pivot axis 80 towards a right side of vehicle 40. In this orientation, blade 46 can direct snow towards the right side of vehicle 40. As illustrated, angle control arm 110" is expanded such that plow tube 116 is positioned further outside of vehicle tube 114 and such that arm length 111" is longer than in the arrangement of FIGS. 1-6 and the arrangement of FIG. 11. Blade 46 and pivot assembly 78 are fixed in the right-pivoted configuration due to the extended arm length 111" of angle control arm 110". As should be appreciated, angle control arm 110 could be positioned on another portion of mount 50 such that extending arm length 111 fixes the orientation of blade 46 and pivot assembly 78 towards the left side of vehicle 40 and shortening arm length 111 fixes the orientation towards the right side. Further, mount 50 can be arranged in various other configurations between the configurations of FIGS. 11 and 12. For instance, with arm pin openings 120 spaced at various intervals, a user can couple tubes 112 using arm pin 118 at various arm pin openings 120 such as to fix the orientation of blade 46 and pivot assembly 78 at various intervals around pivot axis 80.

While the present disclosure has been illustrated and described in detail in the drawings and foregoing description, the same is to be considered as illustrative and not restrictive in character, it being understood that a preferred embodiment has been shown and described and that all changes, equivalents, and modifications that come within the spirit of the claimed invention defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The language used in the claims and the written description and in the above definitions is to only have its plain and ordinary meaning, except for terms explicitly defined above. Such plain and ordinary meaning is defined here as inclusive of all consistent dictionary definitions from the most recently published (on the filing date of this document) general purpose Merriam-Webster dictionary.

The invention claimed is:

1. A mount for a snow plow, wherein the mount is configured to attach to a vehicle and to a snow plow blade, the mount comprising:

a frame comprising a pivot positioned on a plow side of the mount, wherein the frame is configured to attach to the vehicle on a vehicle side of the mount; and a pivot assembly comprising an upper plate, a forward plate, and a lower plate, wherein the pivot assembly is rotatably coupled to the pivot with the upper plate positioned on an upper side of the pivot, the lower plate positioned on a lower side of the pivot, and the forward plate positioned opposite the frame, first and second flanges that extend above the upper plate, below the lower plate and forward of the forward plate, where the first flange is positioned on one side of the pivot assembly and the second flange is positioned on the other side of the pivot assembly, opposite the first flange; and a first and second adjustment block that are selectively coupled to the first and second flanges in a plurality of positions, wherein moving the first and second adjustment blocks to a different position varies a blade angle between the snow plow blade and the pivot assembly;

wherein the pivot assembly is configured to rotatably mount the snow plow blade.

2. The mount of claim 1, wherein the upper plate, the forward plate and the lower plate are a monolithic structure formed from a single piece of material or formed from a plurality of pieces welded together.

3. The mount of claim 1, wherein the upper and lower plates are parallel to each other.

4. The mount of claim 1, further comprising a bracket extending away from the upper plate at an angle.

5. The mount of claim 4, wherein the bracket and the upper plate are a monolithic structure formed from a single piece of material or formed from a plurality of pieces welded together.

6. The mount of claim 4, wherein the bracket defines a first and second spring opening on opposing sides of the bracket, wherein the first and second spring openings are configured to receive springs that bias the snow plow blade to rotate toward the pivot assembly.

7. The mount of claim 1, wherein the upper plate defines a first opening and the lower plate defines a second opening aligned with the first opening.

8. The mount of claim 7, further comprising a pin that extends through the first and second openings and the pivot, wherein the pin rotatably couples the pivot assembly to the frame.

9. The mount of claim 1, wherein the first and second flanges each define an opening that receives the upper plate, the forward plate and the lower plate.

10. The mount of claim 9, wherein the first and second flanges are C-shaped.

11. The mount of claim 1, wherein the first and second flanges each define a blade opening configured to rotatably mount the snow plow blade.

12. The mount of claim 1, wherein the first and second flanges are oriented perpendicular to the upper plate.

13. The mount of claim 1, wherein the first and second flanges are welded to the upper plate, the lower plate and the forward plate.

14. The mount of claim 1, wherein the first and second flanges defines a pivot assembly height that is greater than a height of the pivot.

15. The mount of claim 14, wherein the pivot assembly height is at least twice the height of the pivot.

16. The mount of claim 14, wherein a ratio of the pivot height to the pivot assembly height is between 1:4 and 1:2.

17. The mount of claim 1, wherein the first and second flanges define a blade surface on the plow side, and wherein the blade surface mirrors a surface on the snow plow blade.

18. The mount of claim 1, wherein the mount further comprises an angle control arm, and wherein changing a length of the angle control arm changes an angle of the pivot assembly relative to the frame.

19. The mount of claim 18, wherein the frame further comprises a frame arm mount configured to rotatably couple to a first end of the angle control arm and wherein the pivot assembly further comprises a pivot assembly arm mount configured to rotatably couple to a second end of the angle control arm.

* * * * *